United States Patent

[11] 3,584,920

[72] Inventor Arthur R. Sills
 Lakewood, N.J.
[21] Appl. No. 826,115
[22] Filed May 20, 1969
[45] Patented June 15, 1971
[73] Assignee The United States of America as represented by the Secretary of the Army

[54] SAMPLING DEVICE
 2 Claims, 5 Drawing Figs.
[52] U.S. Cl............................................... 307/257,
 307/297, 307/318
[51] Int. Cl........................................ H03k 17/00
[50] Field of Search............................. 328/151,
 208; 307/257, 318; 323/75 F

[56] References Cited
UNITED STATES PATENTS
2,248,793 7/1941 Terry............................. 323/75
2,817,757 12/1957 Durbin............................ 307/257 X
3,333,110 7/1967 Schanne......................... 307/257

Primary Examiner—Donald D. Forrer
Assistant Examiner—B. P. Davis
Attorneys—Harry M. Saragovitz, Edward J. Kelly, Herbert Berl and Daniel D. Sharp ABSTRACT: A sampling diode bridge circuit in which the sampling diodes of the bridge are reverse biased until rendered conducting by the presence of sampling pulses wherein the reverse biasing voltage for the sampling bridge diodes is created by the sampling pulses and wherein means including a parallel combination of a zener diode and capacitor in series with a resistor in one of the bridge diagonals regulates the reverse biasing voltage during the interval between sampling pulses.

The invention described herein may be manufactured, used, and licensed by or for the Government for Governmental purposes without the payment to me of any royalty thereon.

PATENTED JUN 15 1971 3,584,920
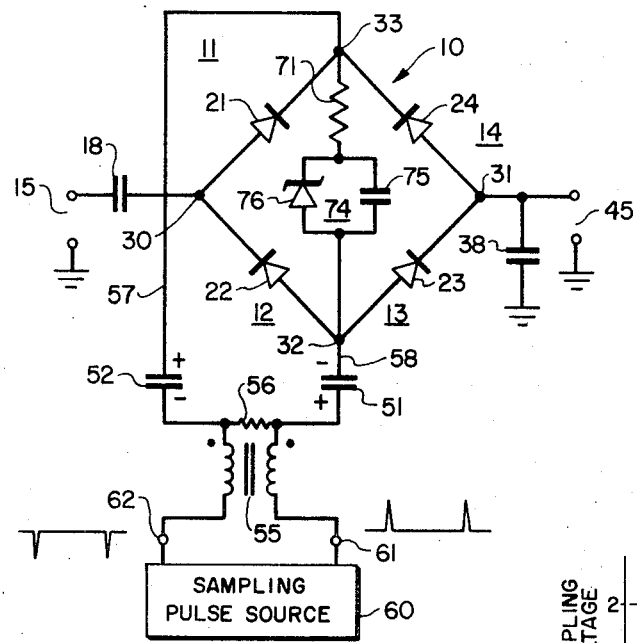
FIG. 1
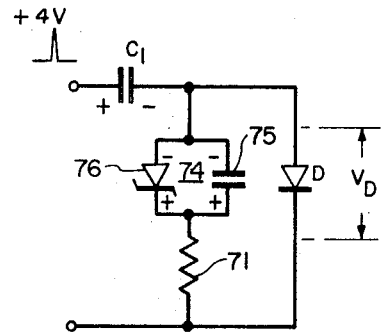
FIG. 2
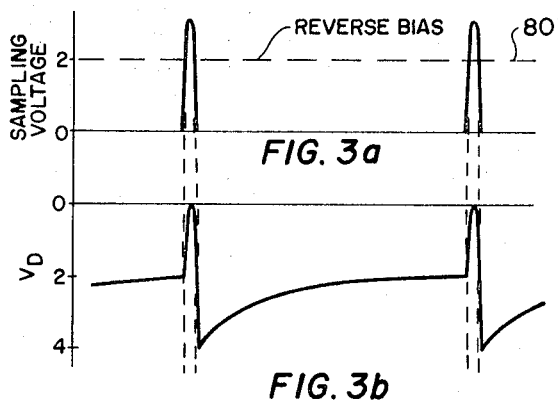
FIG. 3a
FIG. 3b
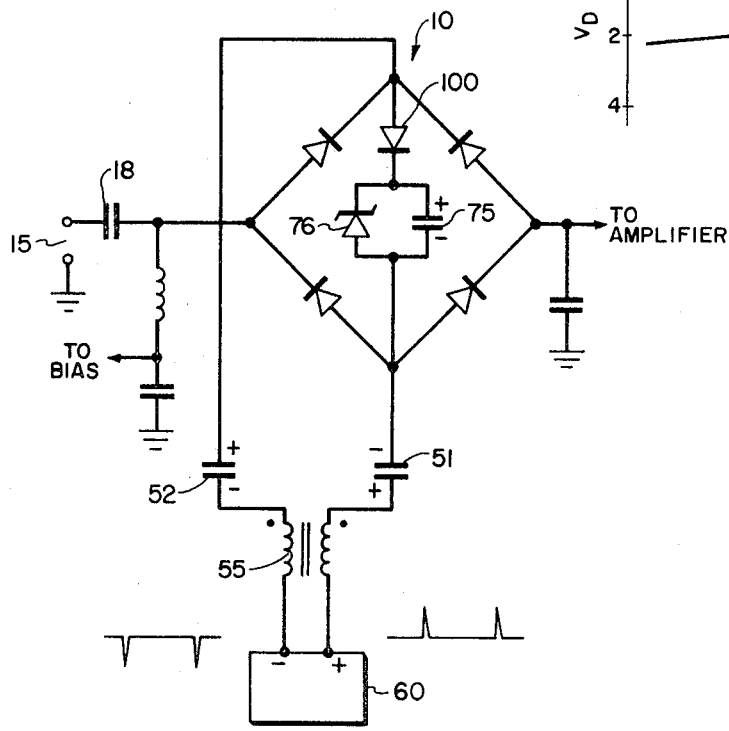
FIG. 4
INVENTOR.
ARTHUR R. SILLS
BY: Daniel S. Sharp
Harry M. Saragovitz,
Edward J. Kelly & Herbert Berl
ATTORNEYS

SAMPLING DEVICE

The invention described herein may be manufactured, used, and licensed by or for the Government for governmental purposes without the payment to me of any royalty thereon.

BACKGROUND OF THE INVENTION

Sampling circuits of the diode bridge type are known which transfer in analog form instantaneous levels of an input signal existing during comparatively short periodic sampling intervals in which the sampling pulses are supplied to the bridge network. In such circuits, means must be provided to maintain the bridge diodes back biased during the relatively long intervals between sampling pulses. To overcome this back bias and allow passage of the input signal through the bridge to an output terminal, sampling pulses are coupled to the bridge by way of coupling capacitor means.

A typical application for such a sampling circuit is as a phase lock discriminator in which the presence or absence of phase lock between a radio frequency input signal and a pulsating signal of fixed repetition rate can be indicated by applying the pulsating signal as sampling pulses at one diagonal of the diode bridge and the oscillator signal or voltage to be sampled to the other bridge diagonal. If the oscillator signal is an exact multiple of the pulsating signal frequency, there will be a constant recurrent level at the output of the diode bridge, whereas any phase differences between the radio frequency input signal and the sampling pulses will result in the average diode bridge output being zero. It is essential that the diodes become conducting only at the precise moment of application of the sampling pulses; otherwise the output may be sampled at a nonuniform rate and the absence of a direct current voltage level at the output will not necessarily be indicative of an unlocked condition. Obviously, therefore, it is essential for such diode sampling techniques that the reverse bias of the bridge diodes remain substantially constant. Since all points of the bridge are at the same potential when the diodes are conducting the capacitors coupling the sampling pulses to the bridge also charge to a different potential. This normally causes a change of voltage on the bridge diodes which may interfere with the turning off of the diodes during the period between sampling pulses.

A self-contained back-biasing source, such as a battery, cannot be depended upon for samplers required in military applications because of the inherent deterioration of battery voltage which becomes worse for batteries which have become stored for a long time prior to insertion into the circuit.

One of the techniques used in the prior art provides the requisite reverse bias for the bridge diodes by using a bias supply externally of the bridge for generating a voltage dependent upon the level of the sampler output translated by the bridge. As the voltage at the various points of the bridge changes with change in input voltage being sampled, this change in voltage at the bridge is applied as a control voltage to the bias supply means for changing the output level of said reverse bias supply means. In this manner, the reverse bias voltage to the bridge diode is kept reasonably constant. This technique requires the use of additional control circuitry and complicates equipment design, as well as consuming additional power.

SUMMARY OF THE INVENTION

The diode sampling technique of the invention obviates the need for reliance upon power sources which undergo voltage changes, even when not in use, and which also eliminates the need for direct current feedback for control of the diode bridge reverse bias supply.

In accordance with the invention, the reverse bias voltage for the sampling bridge diodes is created by the sampling source signal. The parallel combination of a voltage regulating device, such as a zener diode, and a capacitor is connected in series with either a diode or resistor in the diagonal of the bridge interconnecting those points to which the sampling pulses are applied. The sampling pulses are applied to the bridge by way of charging capacitors in each of the sampling input lines. Initially the bridge capacitor is charged by rectification of the sampling pulse input by the sampling bridge diodes. The reverse biasing voltage for the bridge diodes is regulated by the aforesaid circuit during the intervals between sampling pulses. This reverse biasing voltage remains substantially unaffected between sampling pulses and is of the proper magnitude and polarity to maintain all bridge diodes nonconducting upon cessation of the sampling pulses. The time constant of the bridge capacitor is made relatively large so that it retains its charge during intervals between sampling pulses. Henceforth, the diodes will remain back biased during the absence of sampling pulses. The charging capacitor means have a short time constant and discharge rapidly through the zener diode and either said series diode or resistor during the interval between sampling pulses so that the level of the voltage on the charging capacitor means decays rapidly to a level below that at which the sampling diodes become conducting.

DESCRIPTION OF THE DRAWING

FIG. 1 is a circuit diagram showing an embodiment of the invention;

FIG. 2 is an equivalent circuit of the circuit shown in FIG. 1;

FIGS. 3a and 3b are waveforms illustrating certain aspects of operation of the sampling circuit; and FIG. 4 is a diagram showing a modification of the circuit shown in FIG. 1.

DETAILED DESCRIPTION OF THE PREFERRED EMBODIMENT

Referring to FIG. 1, the sampling circuit includes a sampling diode bridge 10 having first, second, third and fourth bridge arms 11, 12, 13 and 14 connected in the order named to form a closed loop. The arms 11, 12, 13 and 14 each contain respective diodes 21, 22, 23 and 24.

A radio frequency input signal, which, by way of example, may be a sinusoidal waveform of from about 40 to 60 MHz., appearing at input terminal means 15 is applied by way of coupling capacitor 18 to a first junction 30 of adjacent arms 11 and 12 of the diode bridge 10. As will be explained subsequently, when the bridge diodes 21 to 24 are conductive, an output is derived at a second junction 31 of adjacent bridge arms 13 and 14 and is coupled by way of output capacitor 38 to output terminal means 45; the latter may, in some instances, be amplified by a direct current amplifier, not shown.

The junctions 32 and 33 of the bridge 10 are connected through respective charging capacitors 51 and 52, and a balanced transmission line to the positive and negative terminals 61 and 62 of a reference source 60 of pulses of accurately controlled repetition rate, such as a crystal-controlled blocking oscillator. The transmission line can be properly terminated by a resistor 56. Since a balanced pulse input is used for the bridge 10, the polarities of the capacitors 51 and 52 are indicated in FIG. 1 during the initial sampling pulse signal from sampling pulse source 60. Because of the balanced sampling pulse input, the pulses built up on line 57 and 58 are identical except for polarity and both halves of the bridge are rendered conducting simultaneously.

The diodes 21 and 22 in the first pair of adjacent arms 11 and 12, as well as the diodes 23 and 24 in the second pair of arms 13 and 14 are connected in opposite directions. Connected into the bridge diagonal interconnecting junctions 32 and 33 is a resistor 71 in series with a shunt circuit 74, the latter consisting of a capacitor 75 and a zener diode 76.

Since the input to the bridge 10 is balanced, the equivalent circuit of the circuit of FIG. 1 can be represented as shown in FIG. 2. The bridge diodes 23 and 24 can be represented as a single diode D and only the capacitor 51, indicated in FIG. 2 by the reference C1, need be shown. The remaining half of the bridge circuit, including diodes 21 and 22 can be omitted in considering the equivalent circuit of FIG. 2.

During the sampling pulse interval, a sampling pulse, indicated as having a magnitude of +4 volts, is of sufficient magnitude to exceed the level shown by the dashed line 80 in FIG. 3a necessary to render diode D conducting. Capacitor C1 than is charged with the polarity indicated in FIG. 2. This charge of capacitor C1 is transferred to the bridge capacitor 75 after the pulse is gone. Capacitor 75, however, can charge only to the breakdown voltage of the zener diode 76. In the application given here, the zener diode breakdown voltage is 2 volts and the level of dashed line 80 of FIG. 3a is so indicated. As shown in FIG. 3b, the voltage $V_E$ across the sampling diode D rises substantially to zero since the diode is conducting and has no appreciable voltage drop thereacross. When the sampling input pulse disappears, the diode D is reverse biased by the stored voltage appearing across diode 75 and the voltage across the diode D increases negatively to −5 volts (the voltage now appearing at capacitor C1). The polarity of the voltage across the bridge capacitor 75 is such that diode D in shunt with capacitor 75 is reverse biased instantaneously by more than 2 volts.

The charge on the relatively large bridge capacitor 75 remains substantially unaltered, upon disappearance of the sampling pulse, until it again is charged during the next sampling pulse. Furthermore, the voltage on capacitor 75 is held substantially constant by the combined action of the zener diode 76 and resistor 71.

As soon as each sampling pulse terminates, the capacitor C1 (see FIG. 2) discharges rapidly through resistor 71 and zener diode 76 and the diode D is no longer conducting. During the discharge of capacitor C1 the voltage $V_E$ across the sampling diode D, shown in FIG. 3b, rises from about a −4-volt level to the −2-volt level established by the zener diode 76.

Returning to FIG. 1, it is evident that the voltage across the bridge capacitor 75 will be sufficient to cut off all diodes 21 to 24 of bridge 10 during the relatively long interval between sampling pulses. In other words, the reverse bias for the bridge diode is provided by the capacitor-Zener diode network 74 in series with resistor 71 and no dependent bias supply is required. Moreover, the bias thus provided by the passage bridge network is of constant value, since the time constant of the bridge capacitor 75 is large compared with the sampling pulse repetition rate. During the interpulse period, any RF input signal to the bridge is blocked and no output current is available to charge output capacitor 38.

As each sampling pulse terminates, the capacitors 51 and 52 discharge rapidly through the resistor 71 and the zener diode 76 and the bridge diodes once more are reverse biased, thus blocking passage of the RF input to output terminal means 45. During the discharge of capacitor 51 and 52, the voltage across the bridge diodes 21 to 24 of FIG. 1 increase from about −4 volts to the −2-volt level established by the zener diode 76. The discharge time constant is relatively short and depends upon the values of resistor 71 and capacitors 51 and 52. The capacitors 51 and 52 must be discharged to the desired diode cutoff voltage prior to arrival of the next sampling pulse. If the resistor 71 is 10,000 ohms and each of the capacitors 51 and 52 are 180 picofarads a theoretical discharge time constant of 1 microsecond would result and sampling could be had at intervals of about 1 microsecond.

When sampling pulses appear, the reverse bias on all bridge diodes 21 to 24 is overcome, as indicated by the portion of the sampling pulses lying above the dashed line 80 in FIG. 3a and all bridge diodes become conducting. During this interval of diode conduction, the instantaneous value of any radio frequency input signal at input terminal means 15 is transferred through the arms of the bridge and a current flows through the output capacitor 38. The voltage buildup across this capacitor 38 provides an indication of the voltage level of the input signal at the instant of sampling.

Referring again to FIGS. 1 and 2, the minimum resistance of resistor 71 should be large enough that the diode D conducts most of the pulse current; in other words, if resistor 71 is too small, the applied pulses to the bridge will be loaded unduly by this resistor. On the other hand, the resistor 71 should be small enough that, when the sampling pulse is terminated, capacitor C1 is discharged to the desired reverse bias voltage before the next sampling pulse arrives.

As shown in the circuit of FIG. 4, if a diode 100 is used instead of the resistor 71 of FIG. 1, the zener diode network is disconnected from the bridge during the sampling pulse interval and, at the same time provides a fast discharge to the proper voltage for capacitors 51 and 52 after removal of the sampling pulses. The bridge diodes still are biased off by the voltage remaining on capacitors 51 and 52. With a network consisting of the diode 100 in combination with the zener diode 76 and capacitor 75, the latter cannot supply reverse voltage to the bridge diodes, owing to the back bias on diode 100, but merely determines how far capacitors 51 and 52 will discharge after removal of each sampling pulse. In the case where resistor 71 is used, as in FIG. 1, the bias voltage on the bridge diodes also is derived from capacitors 51 and 52, but, because of the presence of resistor 71 in the circuit of FIG. 1, the diodes effectively are in parallel with the shunt network 74 and with capacitors 51 and 52. The terminating resistor 56, shown in the circuit of FIG. 1, is no longer required in the circuit of FIG. 4 since the diode 100 of FIG. 4 serves also to minimize ringing of the transmission line.

What I claim is:

1. A sampling circuit comprising a diode bridged having two pairs of oppositely disposed terminals one of which is receptive of input signals to be sampled; supply means including capacitor means for applying periodically recurring sampling signals to the other of said terminal pairs, and bias means for regulating the reverse bias for said diode bridge during the interval between said sampling pulses; said bias means including said capacitor means, the parallel combination of a voltage regulator device and a capacitor disposed in the bridge diagonal interconnecting said other terminal pair in shunt with said sampling signals, and a diode in series with said shunt connected capacitor and voltage regulator device in the aforesaid bridge diagonal; said diode conducting only during the intervals between said sampling pulses.

2. A sampling circuit according to claim 1 wherein said voltage regulator device is a zener diode.